(12) United States Patent
Daoud

(10) Patent No.: US 6,321,018 B1
(45) Date of Patent: Nov. 20, 2001

(54) FIBER OPTIC TRAY COVER

(75) Inventor: Bassel Hage Daoud, Parsippany, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/364,818

(22) Filed: Jul. 30, 1999

(51) Int. Cl.⁷ .................................................. G02B 6/00
(52) U.S. Cl. ........................................ 385/135; 385/134
(58) Field of Search ................................. 385/134, 135, 385/136, 137

(56) References Cited

U.S. PATENT DOCUMENTS 5,802,237 * 9/1998 Pulido .................................. 385/135
5,999,668 * 12/1999 Hernandez et al. .................. 385/135
6,078,718 * 9/1998 Merriken et al. .................... 385/135

* cited by examiner

Primary Examiner—Brian Healy
(74) Attorney, Agent, or Firm—Howard C. Miskin; Gloria Tsui-Yip

(57) ABSTRACT

The combination of a tray and a cover for fiber optic cables, the tray is adapted to hold fiber optic cables and has upstanding side and rear walls, the upper edge of each wall having a ledge formed by a recessed channel in the edge. A cover is adapted to be applied to the tray and has a plurality of edges which nest within the tray so that its side and rear edges rest on the ledge of the tray. The tray has holes therein for receiving protrusion extending from the cover for frictional engagement. Openings are provided in the walls adjacent to the holes to provide access for a user to lift up the cover from the tray.

18 Claims, 5 Drawing Sheets

FIBER OPTIC TRAY COVER

FIELD OF THE INVENTION

The present invention relates to fiber optic trays and more particularly to an improved fiber optic tray cover.

BACKGROUND

Fiber optic cables are usually stored in holders mounted on a fiber optic tray. In order to protect the fiber optic cables from external elements and accidental dislodgment from the tray, a tray cover is mounted over the fiber optic tray.

A prior art tray comprises a bottom panel having at least two opposite sidewalls extending vertically therefrom. A plurality of tabs extend from each of the opposite sidewalls spaced above and parallel to the bottom panel. The tabs are paired and each of the pair in a different plane parallel to the bottom panel in a spatial relationship forming a gap therebetween. A prior art tray cover comprises a flat thin sheet of material having a configuration and size corresponding to the tray. Assembly of the tray cover to the tray first requires sliding one side of the cover into gaps between each pair of tabs on one sidewall, then flexing the thin cover to slide the other side of the cover into gaps between each pair of tabs on the opposite sidewall. Such a prior art tray and tray cover are difficult to assemble and due to the flexibility of the thin cover, it may be inadvertently removed from the tray to expose the fiber optic cables.

SUMMARY OF THE INVENTION

The present invention avoids these drawbacks and provides a fiber optic tray which is adapted to readily receive a tray cover by a simple push action and mounting it in a recess of the walls of the fiber optic tray. The tray cover is frictionally attached to the fiber optic tray and the fiber optic tray includes clearance areas or openings to permit the user to pull the cover out of the frictional hold. With this invention, the cover is easily attached and cannot be accidentally removed or dislodged.

DETAILED DESCRIPTION OF THE PREFERRED EMBODIMENTS

Figure 1:
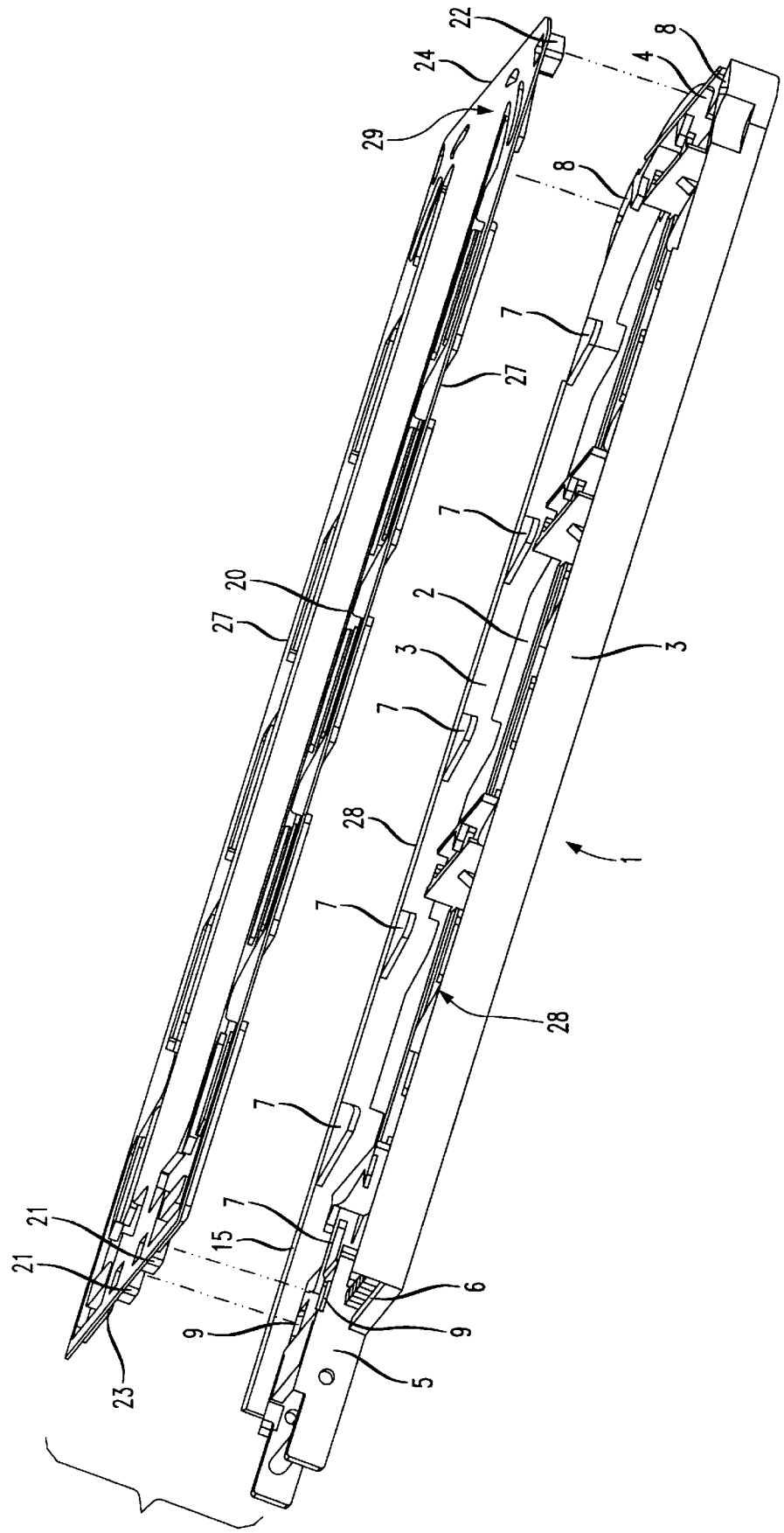
FIG. 1 is an exploded perspective view showing a fiber optic tray and a tray cover made in accordance with the present invention.

Referring to the drawings, the fiber optic tray 1 has a bottom panel 2, upstanding side walls 3, a rear wall 4 and a front handle assembly 5. A plurality of channels 6 are provided on either side of the handle assembly 5 for ingress and egress of fiber optic cables (not shown) into and out of the fiber optic tray 1. The side and rear walls 3 and 4 have a plurality of tabs 7 extending inwardly therefrom, parallel to and spaced above the bottom panel 2. The handle assembly 5 also has a tab 7 extending inwardly therefrom. The bottom panel 2 of the tray 1 also has spaces for splice holders (not shown). The rear wall 4 and the handle assembly 5 of the tray 1 are provided with holes 8 and 9, respectively.

Figure 2:
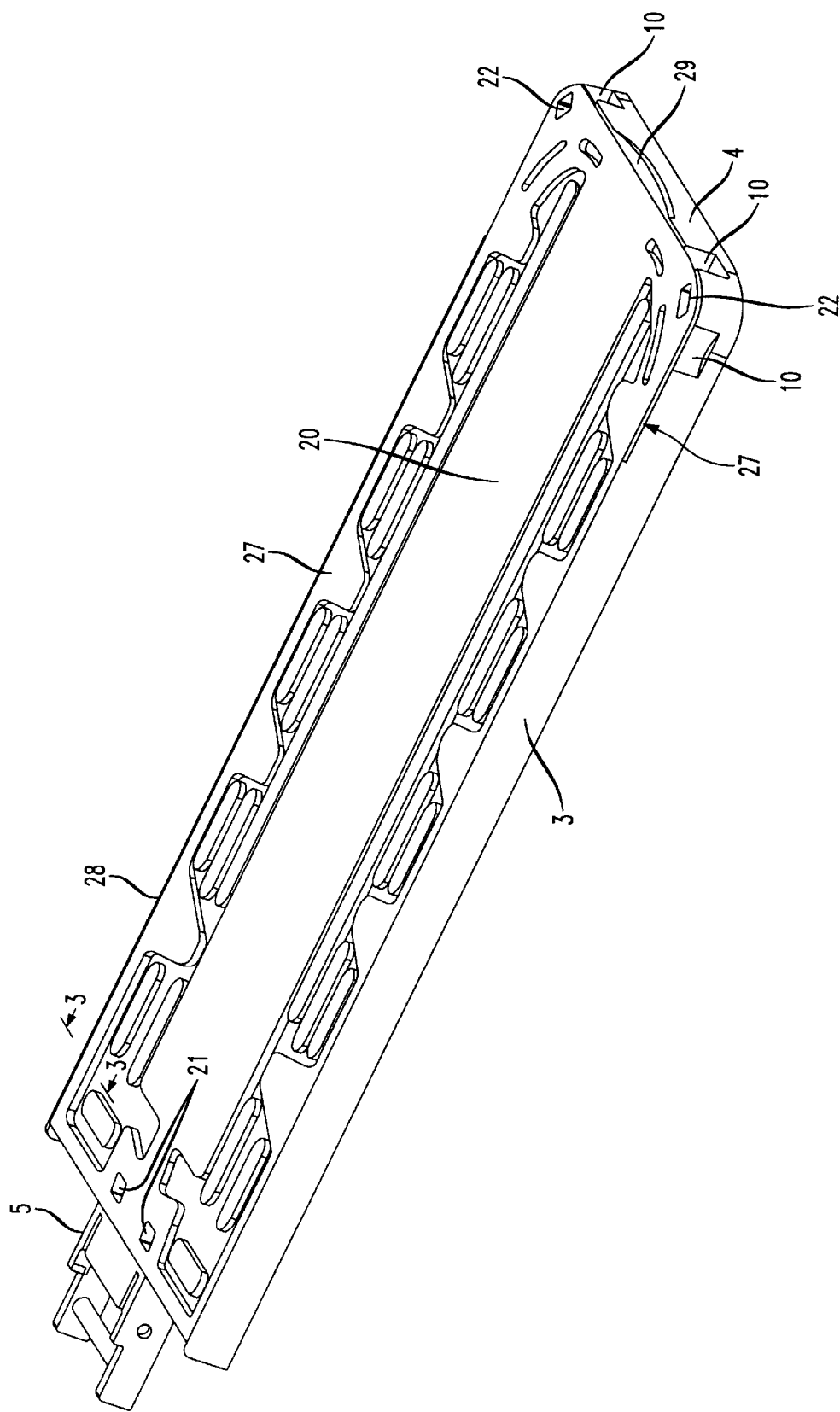
FIG. 2 is a perspective view of the fiber optic tray and the tray cover in assembled position.
Figure 3:
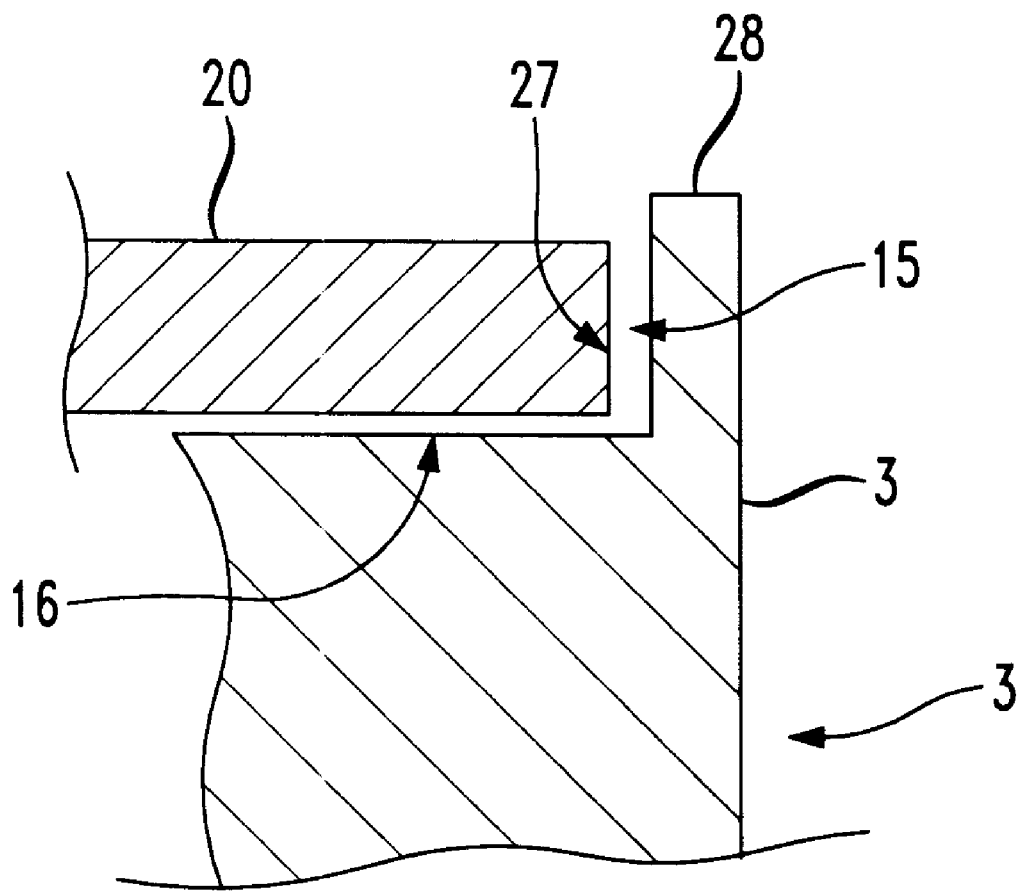
FIG. 3 is a sectional detail of the assembled tray and cover taken along line 3—3 of FIG. 2.

Clearance areas or openings 10 are also provided in the side and rear walls 3 and 4 adjacent the holes 8 (FIG. 2). The upper edges 28 of the side and rear walls 3 and 4 of the tray 1 is formed with a recessed channel 15 to provide a ledge 16 as shown in FIG. 3.

Figure 4:
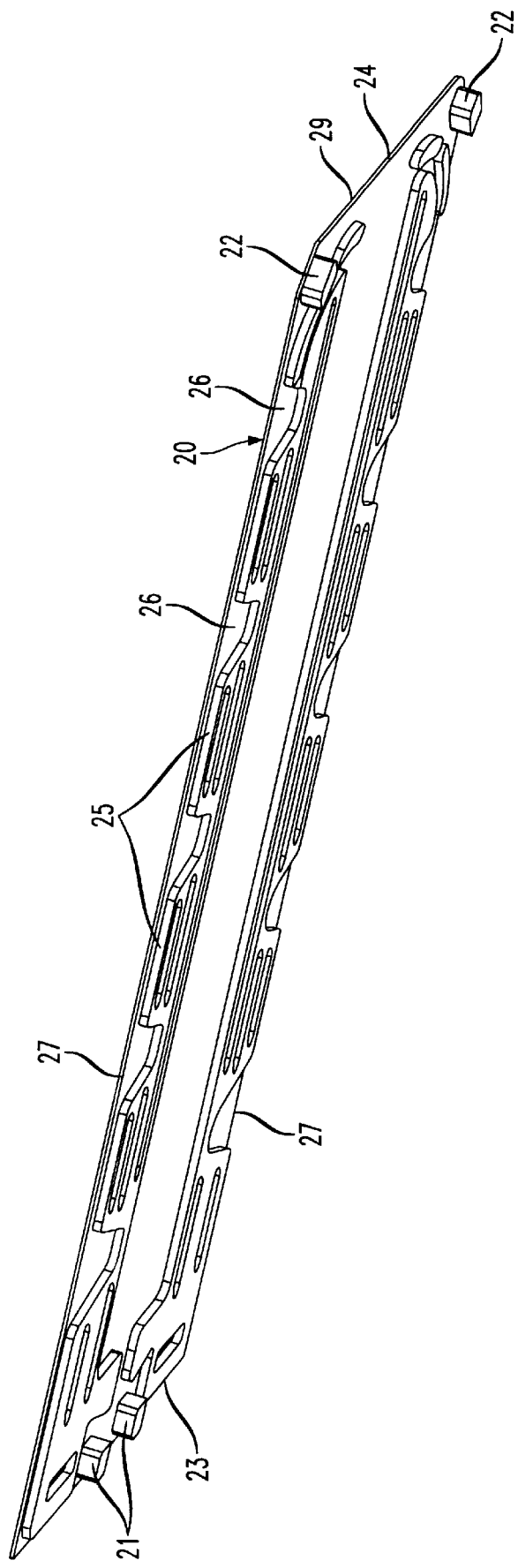
FIG. 4 is a perspective view of the underside of the cover.
Figure 5:
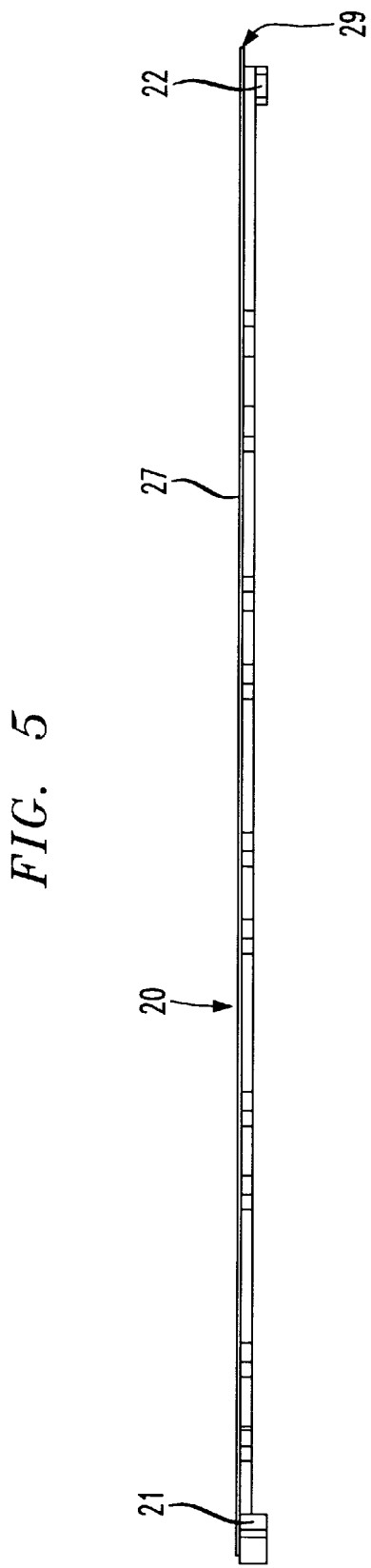
FIG. 5 is a side view thereof.

The cover 20 is a substantially thin flat sheet of material having protrusions 21 and 22 extending downwardly therefrom at its front and rear ends 23 and 24, respectively. Protrusions 21 and 22 correspond to holes 8 and 9 on tray 1, respectively, but slightly larger in size. The cover is preferably made of a clear, flexible plastic. The cover 20 also has a plurality of grooves 25 and notches 26. The protrusions 21 and 22, grooves 25 and notches 26 on the cover 20 are formed by, for example, vacuum molding, generally known in the art. Grooves 25 and notches 26 advantageously increase the stiffness of the thin cover 20 without requiring a thicker material. Notches 26 as shown in FIG. 4 correspond to tabs 7 on tray 1.

Assembly of cover 20 to tray 1 is accomplished by pushing protrusions 21 and 22 of the cover 20 into holes 8 and 9, respectively. Upon closing the cover 20 on tray 1, protrusions 21 and 22 deform to fit into holes 8 and 9, respectively, which are slightly smaller than protrusions 21 and 22. The increased frictional contact between protrusions 21 and 22 and holes 8 and 9, respectively, provide sufficient attachment of cover 20 to tray 1. The distance between the side edges 27 of the cover 20 are slightly smaller than the distance between the channels 15 so that when the cover 20 is placed in the tray 1, it will nest between the side and rear walls 3 and 4 and edges 27 will rest on edges 16 (FIG. 3). Furthermore, tabs 7 of tray 1 mate with corresponding notches 26 to further support cover 20. Preferably, cover 20 should lie below the level of the upper edges 28 of the side walls 3 and 4 of the tray 1, but at least it should be leveled with it.

When it is desired to remove the cover 20 from tray 1, the user may place his fingers in the openings 10 of tray 1 and pull the cover 20 up from underneath to release protrusions 21 and 22 from holes 8 and 9, respectively. Upon removal of the plastic cover 20 from tray 1, the pliability of the plastic cover 20 allows protrusions 21 and 22 to regain their original shape to allow repeated engagement of these protrusions 21 and 22 with holes 8 and 9, respectively.

Although the figures show four protrusions 21 and 22 extending from cover 20, the number and placement of these protrusions can vary without detracting from the present invention.

It will be seen that the present invention provides a tray and a cover in which the cover cannot be accidentally removed or dislodged and in which the cover may be easily attached and removed when desired.

What is claimed is:

1. The combination of a tray and a cover for fiber optic cables, said tray being adapted to hold fiber optic cables, said tray having at least two upstanding peripheral walls with upper edges, each of said peripheral walls having an internally facing surface with a ledge adjacent said upper edge, said cover being adapted to be applied to the tray, said cover having a plurality of peripheral edges wherein each of said peripheral edges cooperatively nests within and adjacent said internally facing surface of a corresponding peripheral wall of said tray and rests on said ledge of said tray.

2. The combination as set forth in claim 1 wherein said ledge is formed by a recessed channel in said wall.

3. A combination as set forth in claim 2; wherein said recessed channel forming said ledge being below said upper edge of said walls.

4. A combination as set forth in claim 3 wherein said tray having two side walls and a rear wall and wherein said recessed channel extends along said side walls and rear wall of said tray.

5. A combination as set forth in claim 4 wherein said tray having holes therein.

6. A combination as set forth in claim 5 wherein openings are provided in said side and rear walls adjacent to said holes.

7. A combination as set forth in claim 1 wherein said tray having a front opposite said rear wall, said holes being adjacent said front of said tray.

8. A combination as set forth in claim 7 wherein the said cover nests below the upper edges of said walls of said tray.

9. A combination as set forth in claim 8 wherein said cover having protrusions extending therefrom, said protrusions adapted to be inserted into said holes of said tray.

10. A tray for fiber optic cables having a cover with peripheral edges, said tray having upstanding peripheral walls with upper edges, each of said peripheral walls having an internally facing surface with a ledge below said upper edge, said ledge being adapted to receive said peripheral edges of said cover.

11. A tray as set forth in claim 10 wherein each of said ledge being formed by a recessed channel in said upper edges.

12. A tray as set forth in claim 11 wherein said tray having two side walls and a rear wall and wherein said recessed channel extends along said side walls and rear wall of said tray.

13. A tray as set forth in claim 12 wherein said tray having holes therein.

14. A tray as set forth in claim 13 wherein openings are provided in said side and rear walls adjacent to said holes.

15. A tray as set forth in claim 14 wherein said tray having a front opposite said rear wall, said holes being adjacent said front of said tray.

16. A fiber optic tray cover for a tray with upstanding peripheral walls having upper edges, internally facing surfaces and ledges below said upper edges, said cover having a plurality of peripheral edges being adapted to cooperatively nest within and adjacent said internally facing surfaces of corresponding peripheral walls of said tray and rest on said ledges of said tray.

17. A cover as set forth in claim 16 wherein said cover being adapted to nest below said upper edges of said tray.

18. A cover as set forth in claim 17 wherein said tray having holes, said cover having protrusions extending therefrom, said protrusions being adapted to be inserted into said holes of said tray.

* * * * *